(No Model.)
P. P. HARING.
BEVERAGE SHAKING AND MIXING MACHINE.
No. 400,674. Patented Apr. 2, 1889.
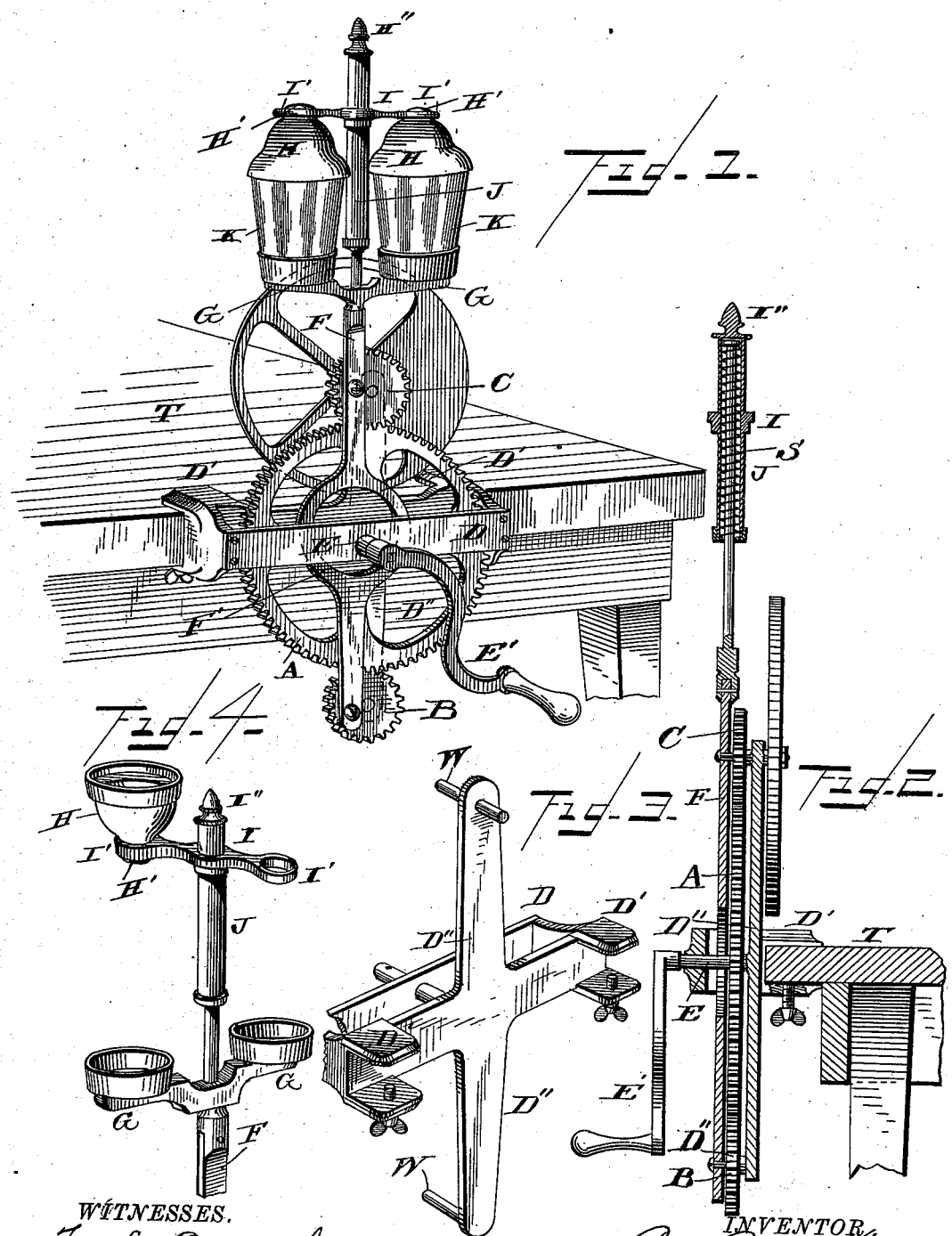
WITNESSES.
INVENTOR.

UNITED STATES PATENT OFFICE.

PETER PAUL HARING, OF BRENHAM, TEXAS.

BEVERAGE SHAKING AND MIXING MACHINE.

SPECIFICATION forming part of Letters Patent No. 400,674, dated April 2, 1889.

Application filed April 26, 1888. Serial No. 271,961. (No model.)

*To all whom it may concern:*

Be it known that I, PETER PAUL HARING, a citizen of the United States, and a resident of Brenham, in the county of Washington and State of Texas, have invented certain new and useful Improvements in Beverage Shaking and Mixing Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved shaking or agitating machine, showing the same ready for use. Fig. 2 is a longitudinal sectional view of the same. Fig. 3 is a detail perspective view of the frame to which the device is secured, and Fig. 4 is a similar view of the upper portion of the machine with one of the tumbler-covers removed and the other cover shown inverted.

Like letters of reference denote corresponding parts in all the figures.

This invention has relation to machines or devices for shaking and mixing beverages—such as milk-punch, egg-phosphate, &c.—which are prepared only at the moment when they are to be consumed, and require thorough and effectual mixing of the several ingredients; and it consists in the machine which will be hereinafter more fully described, and which is adapted to be attached to a counter or the table of a soda-water apparatus in a simple manner, and can be used by any person of ordinary skill for the purpose of mixing and agitating the beverages called for.

Reference being had to the accompanying drawings, the letter T designates a table upon which my machine is attached ready for use by means of the brackets D' and thumb-screws inserted through bearings below the brackets in the usual manner. The brackets and thumb-screws form parts of the main frame D, which frame also forms a bearing for the shaft of the drive-wheel A, said wheel being rotated by means of the center shaft, E, and crank or handle E'. The main wheel A gears with smaller wheels, B and C, one above and the other below it, said wheels B and C being journaled upon stub-axles W, projecting from the arms D'', and attached at right angles to the main frame D. Thus it will be seen that by rotating the main drive-wheel A by means of its crank or handle the two wheels B and C will be revolved in the same direction with each other, but in the opposite direction to the revolution of the wheel A.

The wheels B and C are provided with wrist-pins or cranks which project through apertures of the shaking-bar F. The latter is provided midway between its points of attachment to the wheels B and C with a loop or open enlargement, F', through which the shaft of the main wheel projects, which enables the bar F to oscillate freely up and down, as well as laterally, without striking shaft E during the operation of the machine. Above the upper wheel, C, bar F is provided with two arms, G, the outer ends of which are enlarged to form cups or holders for the tumblers K, the lower ends of which fit into said cups or holders G. The upper end of the shaking-bar F projects into a tube or sleeve, J, which is provided with a cross-bar, I, near its upper end, said cross-bar having rings I' at its outer ends adapted to fit projections H' upon the covers H. These covers are made to fit the tumblers closely and are preferably made of glass. When placed upon the tumblers, they are pressed down against the same by means of a spring, S, which operates to force the cross-bar I down against the covers. The latter may be readily removed by simply taking hold of a milled button, I'', which is connected to and forms part of the tube J, and by pulling the same in an upward direction and at the same time turning the cross-bar at right angles the rings I' will be released from the covers, after which the covers may be readily removed and the tumblers lifted off their respective holders. When the machine is not in use, the rings I' may be used conveniently as holders for the covers in a reversed position, as shown in Fig. 4.

The operation is as follows: The contents to be mixed are placed in the tumblers, after which the covers are placed in position, as shown in Fig. 1. By now turning the crank or handle it will be seen that the bar F, which is worked up and down as well as sidewise, thoroughly agitates and mixes the contents of the tumblers. After the contents have been properly mixed the crank is so turned as to place the shaking-bar in its normal position, (indicated by Fig. 1,) after which the milled nut or head I″ is lifted and the cross-bar I turned at right angles, thus releasing the covers, which are removed and placed in an inverted position in the rings at the ends of the cross-bar adapted for their reception. The tumblers may then be removed and are, with their contents, offered to the consumer.

This machine, it will be seen, is very simple in construction, can be attached to any table or counter, and is always ready for use. It thoroughly agitates and mixes the contents of the tumblers placed in it without danger of its spilling and without the necessity of introducing any devices into the tumblers for the purpose of agitating and mixing their contents. It may be manufactured at a small cost, and its construction is such that it is not liable to get out of order.

Having thus described my invention, I claim and desire to secure by Letters Patent of the United States—

1. The combination of the frame provided with arms at right angles thereto and the main drive-wheel journaled therein, gear-wheels journaled at the ends of the arms, provided with wrist-pins and meshing with the drive-wheel, a shaker-bar connected to the wrist-pins of the gear-wheels and having a loop or opening for the insertion of the shaft of the drive-wheel, and the cups or tumbler-holders attached rigidly to the shaker-bar, substantially as and for the purpose set forth.

2. The combination, with the frame, of the shaker-bar, tumbler-holders, covers for the tumblers, and a spring-actuated movable cross-bar provided at its outer ends with rings adapted to engage with the covers, substantially as and for the purpose set forth.

3. In a machine for agitating and mixing beverages, the combination consisting substantially of the following elements: a suitable frame adapted to be fastened upon a table or other support, a main drive-wheel journaled in said frame and provided with a crank or handle for operating it, a pair of gear-wheels or pinions journaled on the ends of the arms of the frame, provided with wrist-pins and meshing with the main wheel, a shaker-bar connected to the wrist-pins of said wheels, a series of tumbler-holders attached to and projecting laterally from the shaker-bar, the tumblers and covers, and a movable spring-actuated top bar connected to and moving with the shaker-bar and adapted to exert downward pressure upon the covers when the same are placed in position upon the tumblers, substantially as set forth.

In testimony that I claim the foregoing as my own I have hereunto affixed my signature in presence of two witnesses.

PETER PAUL HARING.

Witnesses:
JOHN J. STOPPLE,
JOHN W. GOODE.